(No Model.)
F. KEMPSMITH & T. L. SMITH.
TAIL STOCK FOR MILLING MACHINES.
No. 470,245. Patented Mar. 8, 1892.
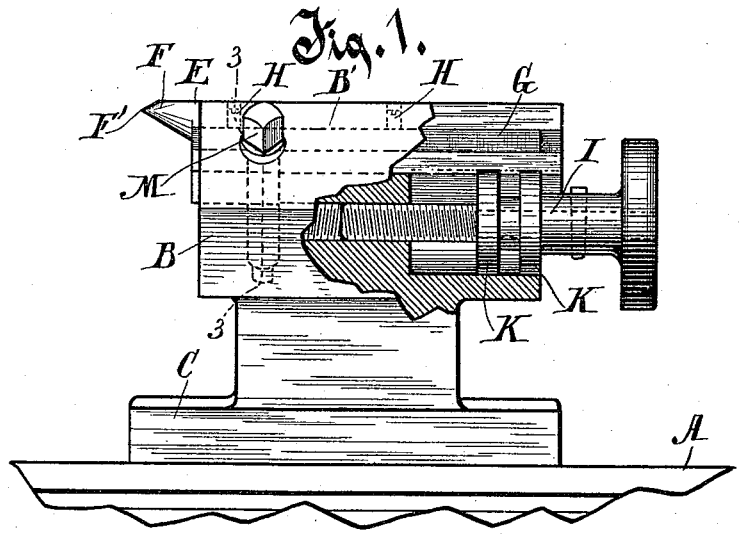
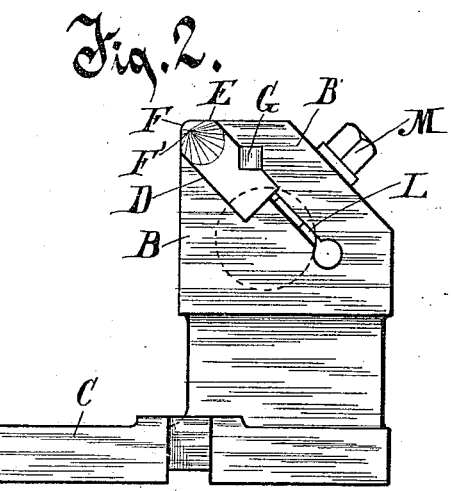 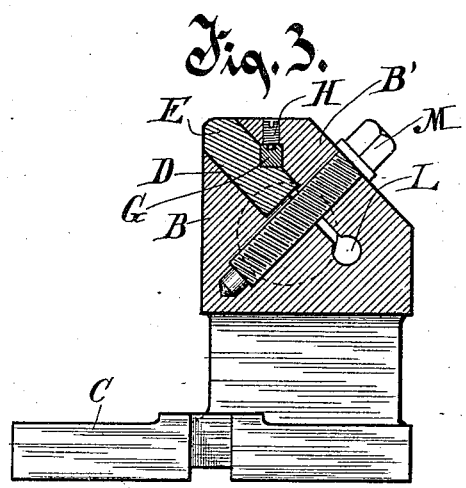
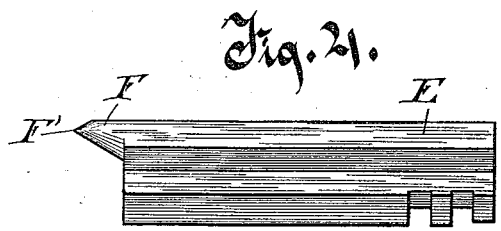
Witnesses.
S. L. Nindlinger
Anna V. Faust
Inventors.
Frank Kempsmith
Thomas L. Smith
By C. H. Benedict
Attorney.

UNITED STATES PATENT OFFICE.

FRANK KEMPSMITH AND THOMAS L. SMITH, OF MILWAUKEE, WISCONSIN; SAID SMITH ASSIGNOR TO SAID KEMPSMITH.

TAIL-STOCK FOR MILLING-MACHINES.

SPECIFICATION forming part of Letters Patent No. 470,245, dated March 8, 1892.

Application filed November 2, 1891. Serial No. 410,580. (No model.)

*To all whom it may concern:*

Be it known that we, FRANK KEMPSMITH and THOMAS L. SMITH, of Milwaukee, in the county of Milwaukee and State of Wisconsin, have invented a new and useful Improvement in Tail-Stocks for Milling-Machines, of which the following is a description, reference being had to the accompanying drawings, which are a part of this specification.

The object of our invention is to provide means in the tail-stock of a milling-machine for supporting the material in such manner that face or end milling-cutters of any diameter can work on the material equally close to the side and to the top, or, in other words, on two sides of the material, thus providing in our machine a single device for doing work that heretofore has required two tail-stocks, one having a top center and the other a side center. With our improved device the squares or faces on taps, reamers, &c., may be cut with a tool of large or any diameter, as the cutter can work up close to the center on two sides of the material or article being milled.

Our invention consists in the novel construction and arrangement of the tail-stock and the parts thereof.

In the drawings, Figure 1 is an elevation of the side of the tail-stock, parts being broken away to show interior construction. Fig. 2 is an elevation of the front or inner end of the tail-stock. Fig. 3 is a vertical transverse section of the tail-stock on line 3 3 of Fig. 1. Fig. 4 is the bar on which the center is formed.

The same letters refer to like parts in all the views.

A is a fragment of the platen of the milling-machine, on which the tail-stock is supported adjustable endwise in the manner in common use. The frame of the head-stock, including the head B and the foot C, is constructed integrally. A channel D in the head of the stock throughout its length is so cut that the plane of its longer transverse axis passes through the junction of the side and top edges of the head of the stock, extending into the head at an angle between the top and side of the head-stock and conveniently and preferably, but not necessarily, at equal angles thereto. A bar E, preferably having its inner edge rectangular with its sides in cross-section, is fitted adjustably in the channel D and carries on its front end, integral therewith, the center F. The point F' of the center F is cone-shaped and is located near the outer edge of the bar E and in the plane of its longer transverse axis. This arrangement locates the center F near to and at equal distances from the top and side of the head of the tail-stock, which is the desirable and important feature of our device.

The bar E is secured adjustable endwise in the head of the tail-stock by a gib G, inserted in a suitable groove therefor in the bar E and in the head of the tail-stock. This gib is secured in place and held up to the bar by a set-screw H, turning in the head of the tail-stock against the gib.

The center-carrying bar E is adjusted endwise by means of a screw I, turning into the head of the tail-stock, the screw being provided with collars K K, which enter transverse grooves therefor in the bar E and by the revolution of the screw move the bar E endwise.

A saw-cut space L longitudinally of the head of the tail-stock, extending inwardly from the bottom of the channel D, separates a portion or leaf B' of the head of the tail-stock from the other part thereof, the leaf or part B' being thereby adapted to be sprung toward or clamped against the bar E, interposed between it and the main portion of the head of the tail-stock. The leaf B' is clamped against the bar E, and the bar thereby held rigidly in position when properly adjusted by means of the binding-screw M, turning through the leaf into the main part of the head of the tail-stock.

From the foregoing description of our device and of the functions of the parts incidentally given with the description the use of the device will be readily understood by all persons skilled in the art.

What we claim as our invention, and desire to secure by Letters Patent, is—

1. In a tail-stock to a milling-machine, having a head with a top and a side arranged substantially at a right angle to each other, a material-supporting center projecting from the end or face of the stock near the junction of the top and side and at equal distances therefrom, as set forth.

2. In the tail-stock of a milling-machine, the combination, with the relatively-fixed head of the tail-stock, of an adjustable center-carrying bar, the bar being located and adjustable endwise in a channel therefor entering the head at the junction of the top and side thereof, the center being located on the end of the bar near to and at equal distances from the top and side of the head of the tail-stock, as set forth.

3. The combination, with the head of a tail-stock in a milling-machine, of a longitudinally-movable center-carrying bar located in a channel therefor in the angle formed by the junction of the top and side of the head of the tail-stock, and a gib arranged to retain the bar adjustable endwise in the head of the tail-stock, substantially as described.

4. The combination, with the head of a tail-stock in a milling-machine, of a center-carrying bar located and adjustable endwise therein in the angle formed by the junction of the top and side of the head of the tail-stock, and an adjusting-screw turning in the head, which screw is provided with collars entering transverse grooves therefor in the bar, whereby by the revolution of the screw the bar is adjusted endwise, substantially as described.

5. The combination, in a tail-stock of a milling-machine, of the head of the stock, having a channel lengthwise thereof at an angle to its top and side, in which a center-carrying bar is located adjustably, the head being further separated into two parts longitudinally by a saw-cut space extending from the bottom of the bar-channel inwardly, and a binding-screw adapted to draw the parts of the head toward each other and clamp the adjustable bar, substantially as described.

In testimony whereof we affix our signatures in presence of two witnesses.

FRANK KEMPSMITH.
THOMAS L. SMITH.

Witnesses:
  C. T. BENEDICT,
  ANNA V. FAUST.